(12) United States Patent
Kim et al.

(10) Patent No.: US 12,440,962 B2
(45) Date of Patent: Oct. 14, 2025

(54) JOINT APPARATUSES FOR ROBOT

(71) Applicants: NAVER CORPORATION, Seongnam-si (KR); Korea University of Technology and Education Industry-University Cooperation Foundation, Cheonan-si (KR)

(72) Inventors: Yong Jae Kim, Cheonan-si (KR); Seong Ho Yun, Goyang-si (KR); Jae Hyun Park, Icheon-si (KR)

(73) Assignees: NAVER Corporation, Gyeonggi-do (KR); Korea University of Technology and Education Industry-University Cooperation Foundation, Chungcheongnam-do (KR)

( * ) Notice: Subject to any disclaimer, the term of this patent is extended or adjusted under 35 U.S.C. 154(b) by 0 days.

(21) Appl. No.: 18/935,096

(22) Filed: Nov. 1, 2024

(65) Prior Publication Data

US 2025/0058458 A1    Feb. 20, 2025

Related U.S. Application Data

(63) Continuation of application No. PCT/KR2023/006150, filed on May 4, 2023.

(30) Foreign Application Priority Data

May 4, 2022  (KR) .................. 10-2022-0055215

(51) Int. Cl.
  *B25J 9/10*  (2006.01)
  *B25J 9/00*  (2006.01)
(52) U.S. Cl.
  CPC ............. *B25J 9/104* (2013.01); *B25J 9/0006* (2013.01)

(58) Field of Classification Search
  CPC ........ B25J 9/0006; B25J 9/104; B25J 9/1045; B25J 17/00; B25J 17/0241; B25J 17/025; B25J 18/04
  See application file for complete search history.

(56) References Cited

U.S. PATENT DOCUMENTS 5,784,542 A     7/1998  Ohm et al.
8,297,672 B2 *  10/2012  Kim .................. B25J 9/104
                                                   901/29
(Continued)

FOREIGN PATENT DOCUMENTS

KR   10-20100008687 A   1/2010
KR   10-20100053005 A   5/2010
(Continued)

OTHER PUBLICATIONS

International Search Report, dated Aug. 8, 2023, issued in International Patent Application No. PCT/ KR2023/006150.

*Primary Examiner* — Bobby Rushing, Jr.
(74) *Attorney, Agent, or Firm* — Harness, Dickey & Pierce, P.L.C.

(57) ABSTRACT

A robot joint device having an upper arm unit including a first rotating pulley, a second rotating pulley and a third rotating pulley sequentially arranged in one direction, a forearm unit including a fixing pulley configured to rolling-contact the third rotating pulley, a connection unit including a first pivot shaft passing through the third rotating pulley and being connected to the upper arm unit, and a second pivot shaft passing through the fixing pulley and being connected to the forearm unit, a first cable unit wound around the first rotating pulley in a first direction, bent between the second rotating pulley and the third rotating pulley, and fixed to the fixing pulley, and a second cable unit wound around the first rotating pulley in a second direction (Continued)

opposite to the first direction, bent between the second rotating pulley and the third rotating pulley, and fixed to the fixing pulley.

20 Claims, 14 Drawing Sheets

(56) References Cited

U.S. PATENT DOCUMENTS

| | | | | |
|---|---|---|---|---|
| 2014/0331798 A1* | 11/2014 | Shim | ........................ | B25J 9/104 74/89.22 |
| 2017/0348176 A1* | 12/2017 | Herr | ........................ | B25J 9/0006 |
| 2020/0114527 A1* | 4/2020 | Kimura | .................... | B25J 15/08 |

FOREIGN PATENT DOCUMENTS

| KR | 10-20160111775 A | 9/2016 | | |
|---|---|---|---|---|
| KR | 10-20190129343 A | 11/2019 | | |
| KR | 102131321 B1 * | 7/2020 | ............ | B25J 9/1045 |
| KR | 10-20200129209 A | 11/2020 | | |
| KR | 102194508 B1 * | 12/2020 | ............. | A61F 2/586 |

\* cited by examiner

JOINT APPARATUSES FOR ROBOT

CROSS-REFERENCE TO RELATED APPLICATIONS

This U.S. non-provisional application is a continuation application of, and claims the benefit of priority under 35 U.S.C. § 365(c) to, International Application No. PCT/KR2023/006150, filed May 4, 2023, which claims priority to Korean Application No. 10-2022-0055215, filed May 4, 2022, the entire contents of each of which are hereby incorporated by reference.

TECHNICAL FIELD

The inventive concepts relate to a joint device for a robot arm having a rolling-contact joint mechanism.

BACKGROUND

Robotics has become an essential technology in the fields of production, service, medicine, exploration, military, aerospace, etc., thanks to rapid technological development and the spread of fields to which robotics are applied. Existing robots aim to precisely perform simple repetitive tasks at higher speeds, but recently, various types and levels of robots have been developed, such as robots that share activity spaces with people and industrial robots that enable safe physical contact with humans.

Therefore, robot technology should detect external forces, be safe during contact and collision, and satisfy higher strength, rigidity, precision, and task speed. To this end, technology to implement robot joints having structures and performances similar to those of a human arm with a high degree of freedom (DOF) is emerging as a key research topic. In fact, research results reflecting research outcomes on this topic are being published.

However, there is a challenge in that the robot joint structures that have been developed so far rely on higher complexity in order to achieve a higher DOF and range of motion while having sufficient strength and rigidity. In more simplified robot joint structures, the performance of the robot joint inevitably deteriorates.

SUMMARY

Some example embodiments address the above-described challenge. For instance, some example embodiments provide a robot joint device that has a simpler structure, is lightweight, increases a reduction ratio, and/or has higher strength and/or rigidity even when an angle of the joint changes.

Some example embodiments provide a robot joint device that can minimize (or reduce) a load applied to a drive cable, an electric cable, etc., passing through a joint area.

According to some example embodiments, a robot joint device includes: an upper arm unit including a first rotating pulley, a second rotating pulley and a third rotating pulley sequentially arranged in one direction, a forearm unit including a fixing pulley, the fixing pulley being configured to come into a rolling-contact with the third rotating pulley, a connection unit including a first pivot shaft and a second pivot shaft, the first pivot shaft passing through the third rotating pulley and being connected to the upper arm unit, and the second pivot shaft passing through the fixing pulley and being connected to the forearm unit, a first cable unit wound around the first rotating pulley in a first direction, the first cable unit being bent between the second rotating pulley and the third rotating pulley, and the first cable unit being fixed to the fixing pulley, and a second cable unit wound around the first rotating pulley in a second direction opposite to the first direction, the second cable unit being bent between the second rotating pulley and the third rotating pulley, and the second cable unit being fixed to the fixing pulley.

A diameter of a winding portion of the third rotating pulley may be larger than a diameter of a winding portion of the first rotating pulley.

The winding portion of the third rotating pulley and the winding portion of the fixing pulley may have a same diameter.

Each of the first cable unit and the second cable unit may include a first cable wound around the first rotating pulley overlapping in two lines, the first cable having a first diameter, a second cable connected to the first cable and partially wound around each of the second rotating pulley, the third rotating pulley and the fixing pulley in a single line, the second cable having a second diameter larger than the first diameter, and a fixing member an end part of the second cable, the fixing member being fastened to the fixing pulley.

The fixing member may be configured to adjust an insertion depth into the fixing pulley to adjust tension.

The robot joint device may further include: a support frame configured to rotatably support the third rotating pulley, the support frame including a round portion corresponding to an outer circumference of the third rotating pulley, a first restraint cable unit fixed to the fixing pulley and the round portion such that the fixing pulley comes into rolling-contact with the third rotating pulley, and a second restraint cable unit fixed to the fixing pulley and the round portion while intersecting the first restraint cable unit such that the fixing pulley comes into rolling-contact with the third rotating pulley.

Each of the first restraint cable unit and the second restraint cable unit may include a restraint cable partially wound around the round portion and the fixing pulley, and fixing members at both end parts of the restraint cable, the fixing members being fastened to the round portion and the fixing pulley, respectively.

The fixing members may include a first fixing member and a second fixing member, the first fixing member may be configured to adjust an insertion depth into the round portion to adjust tension, and the second fixing member may be configured to adjust an insertion depth into the fixing pulley to adjust tension.

According to some example embodiments, the upper arm unit may include a fourth rotating pulley opposite to the third rotating pulley with the support frame interposed therebetween, the forearm unit may include a fifth rotating pulley and a sixth rotating pulley on opposing sides of the fixing pulley, the fifth rotating pulley and the third rotating pulley may be on a same plane, and the sixth rotating pulley and the fourth rotating pulley may be on a same plane, and the robot joint device may further include a first drive cable on the third rotating pulley and the fifth rotating pulley for driving a wrist joint assembly, and a second drive cable on the fourth rotating pulley and the sixth rotating pulley for driving the wrist joint assembly.

The upper arm unit may include an upper arm frame rotatably installed on the first pivot shaft, the forearm unit may include a forearm frame rotatably installed on the second pivot shaft, and the connection unit may include a stopper configured to contact the upper arm frame and the forearm frame at a first angle to limit both a rotation angle of the upper arm unit and a rotation angle of the forearm unit relative to the connection unit.

The connection unit may include an opening corresponding to the stopper such that the upper arm frame and the forearm frame contacting the stopper while the forearm unit extends at a maximum angle with respect to the upper arm unit is visible through the opening.

According to some example embodiments, the robot joint device may further include a first bracket on one side of the third rotating pulley facing the upper arm frame, a second bracket on one side of the fixing pulley facing the forearm frame, and an electric cable on a winding portion of the first bracket and a winding portion of the second bracket.

In addition, according to some example embodiments, a robot joint device includes: an upper arm unit including a rotating pulley, a forearm unit including a fixing pulley, the fixing pulley being configured to come into rolling-contact with the rotating pulley based on the forearm unit rotating relative to the upper arm unit, a connection unit including a first pivot shaft and a second pivot shaft, the first pivot shaft passing through the rotating pulley and being connected to the upper arm unit, and the second pivot shaft passing through the fixing pulley and being connected to the forearm unit, a first cable unit covering the rotating pulley and a part of the fixing pulley, the first cable unit being fixed to the fixing pulley, and a second cable unit covering the rotating pulley and another part of the fixing pulley, the second cable unit being fixed to the fixing pulley.

A winding portion of the rotating pulley and a winding portion of the fixing pulley may have a same diameter.

The robot joint device may further include: a support frame configured to rotatably support the rotating pulley, the support frame including a round portion corresponding to an outer circumference of the rotating pulley, a first restraint cable unit fixed to the fixing pulley and the round portion such that the fixing pulley comes into rolling-contact with the rotating pulley, and a second restraint cable unit fixed to the fixing pulley and the round portion while intersecting the first restraint cable unit such that the fixing pulley comes into rolling-contact with the rotating pulley.

Each of the first restraint cable unit and the second restraint cable unit may include a restraint cable partially wound around the round portion and the fixing pulley, and fixing members at both end parts of the restraint cable, the fixing members being fastened to the round portion and the fixing pulley, respectively.

The fixing members may include a first fixing member and a second fixing member, the first fixing member may be configured to adjust an insertion depth into the round portion to adjust tension, and the second fixing member may be configured to adjust an insertion depth into the fixing pulley to adjust tension.

The rotating pulley may be a first rotating pulley, the upper arm unit may include a second rotating pulley opposite to the first rotating pulley with the support frame interposed therebetween, the forearm unit may include a third rotating pulley and a fourth rotating pulley on opposing sides of the fixing pulley, the third rotating pulley and the first rotating pulley may be on a same plane, and the fourth rotating pulley and the second rotating pulley may be on a same plane, and the robot joint device may further include a first drive cable on the first rotating pulley and the third rotating pulley for driving a wrist joint assembly, and a second drive cable on the second rotating pulley and the fourth rotating pulley for driving the wrist joint assembly.

The upper arm unit may include an upper arm frame rotatably installed on the first pivot shaft, the forearm unit may include a forearm frame rotatably installed on the second pivot shaft, and the connection unit may include a stopper configured to contact the upper arm frame and the forearm frame at a first angle to limit both a rotation angle of the upper arm unit and a rotation angle of the forearm unit relative to the connection unit.

According to some example embodiments, the robot joint device may further include a first bracket on one side of the rotating pulley facing the upper arm frame, a second bracket on one side of the fixing pulley facing the forearm frame, and an electric cable on a winding portion of the first bracket and a winding portion of the second bracket.

Effects of the inventive concepts obtained through the above-described solutions are as follows.

First, since an upper arm unit and a forearm unit are connected by a cable-driven rolling joint, a thin and lightweight joint device may be implemented. In the above structure, it is possible to increase a reduction ratio by increasing a diameter of a winding portion of a third rotating pulley compared to a diameter of a winding portion of a first rotating pulley. In addition, since lengths of first and second cable units wound around the third rotating pulley and a fixing pulley is maintained constant (or nearly constant) while the forearm unit relatively rotates with respect to the upper arm unit, it is possible to maintain higher strength and rigidity even when the angle of the joint changes.

Second, since a drive cable for driving a wrist is arranged alternately on two pulleys forming the rolling joint so that the length of the cable does not change (or does not change substantially) while the forearm unit relatively rotates with respect to the upper arm unit, it is possible to minimize (or reduce) a load applied to the cable when the angle of the joint changes. The above structure may be equally applied to the arrangement of electric cables for electrical connection with electronic components.

DETAILED DESCRIPTION

Figure 1:
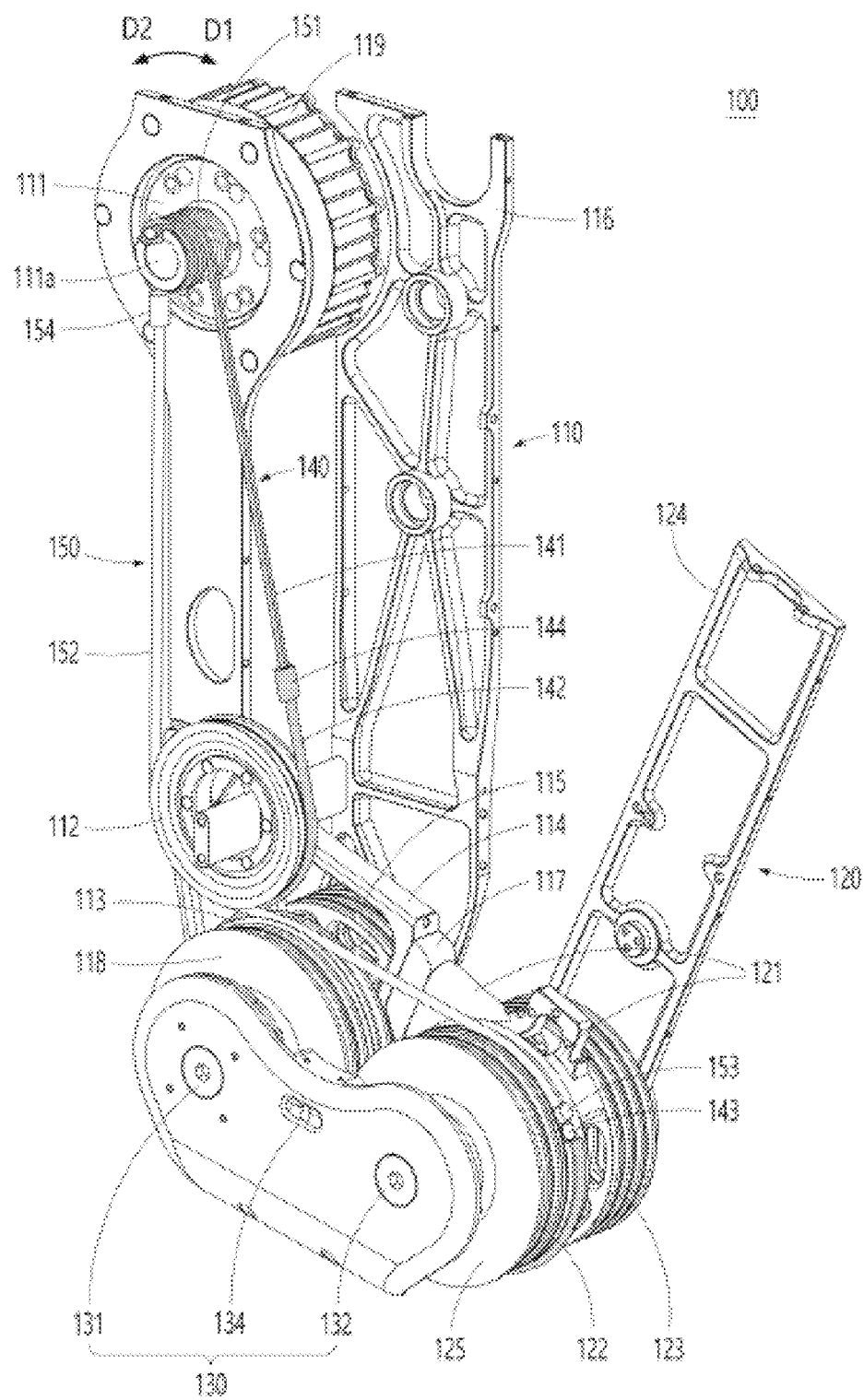
FIG. 1 is a perspective view of a robot joint device according to some example embodiments.

Hereinafter, some example embodiments disclosed in this specification will be described in detail with reference to the accompanying drawings in which the same or similar components will be denoted by the same (or similar) reference numerals, and an overlapping description of the same or similar components will be omitted. In addition, the terms "module" and "unit" for components used in the following description may be used interchangeably. Further, detailed descriptions of related known technologies that may obscure the gist of example embodiments disclosed in this specification are omitted herein. In addition, it is to be understood that the accompanying drawings are provided only for ease of understanding of some example embodiments disclosed in this specification, and the technical idea disclosed in this specification is not limited by the accompanying drawings but includes all the modifications, equivalents, and substitutions included in the spirit and the scope of the inventive concepts.

Terms including ordinal numbers such as 'first' and 'second' may be used to describe various components, but these components are not limited by these terms. Instead, these terms are used to distinguish one component from another component.

It is to be understood that when one component is referred to as being "connected to" or "coupled to" another component, one component may be connected directly to or coupled directly to the other component, or be connected to or coupled to the other component with a further component interposed therebetween. On the other hand, it is to be understood that when one component is referred to as being "connected directly to" or "coupled directly to" another component, it may be connected to or coupled to the other component without the further component interposed therebetween.

Singular forms include plural forms unless the context clearly indicates otherwise.

It will be further understood that the terms "include" or "have" used in the present specification specify the presence of features, numerals, operations, components, and/or parts mentioned in the present specification, or combinations thereof, but do not preclude the presence or addition of one or more other features, numerals, operations, components, and/or parts, or combinations thereof.

Figure 2:
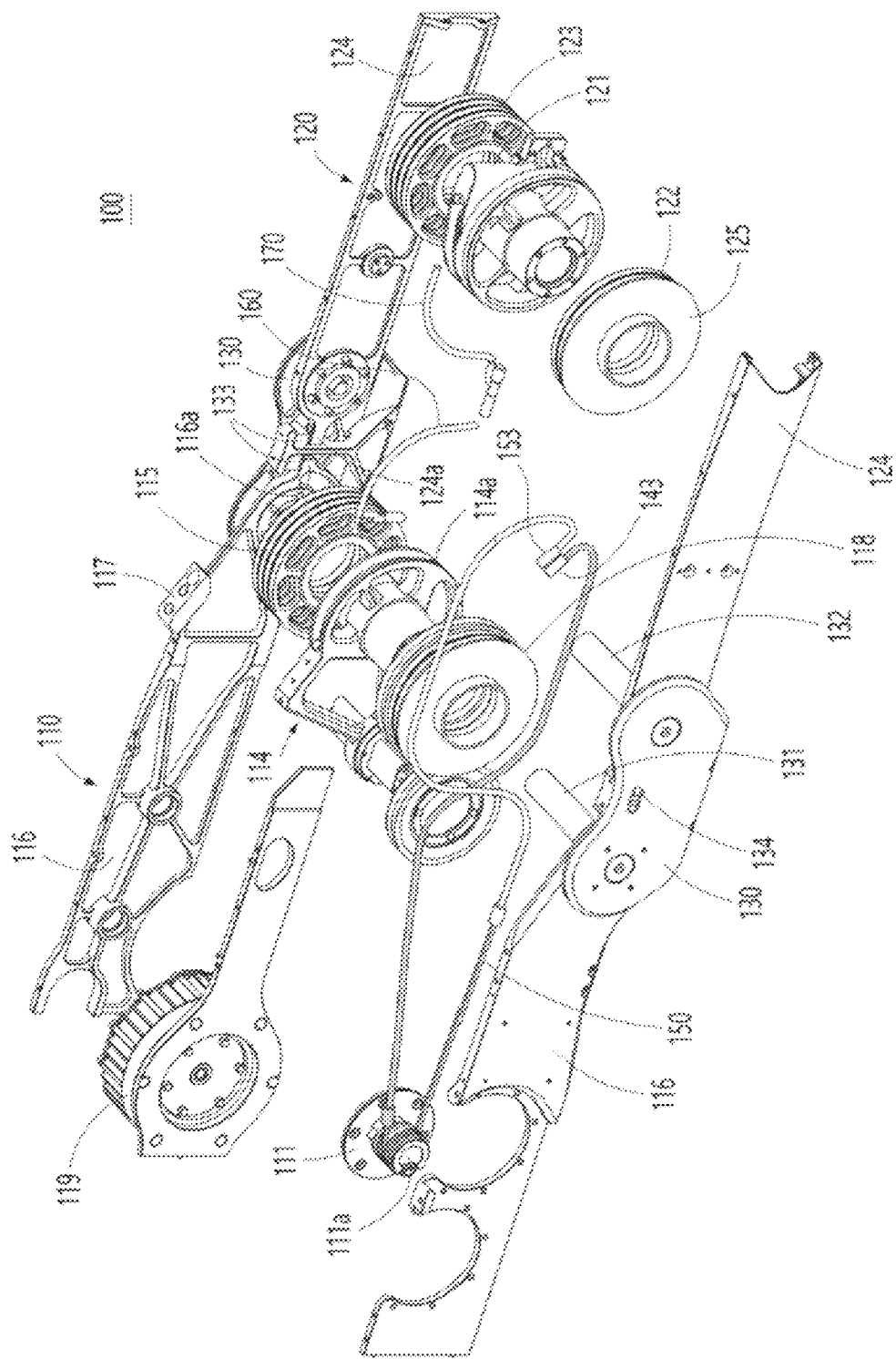
FIG. 2 is an exploded perspective view of the robot joint device illustrated in FIG. 1.

FIG. 1 is a perspective view illustrating a robot joint device 100 according to some example embodiments, and FIG. 2 is an exploded perspective view of the robot joint device 100 illustrated in FIG. 1.

Referring to FIGS. 1 to 2, the robot joint device 100 of some example embodiments may be applied to an arm portion of a humanoid robot. The robot joint device 100 includes an upper arm unit 110, a forearm unit 120, a connection unit 130, a first cable unit 140, and/or a second cable unit 150.

The upper arm unit 110 and the forearm unit 120 are rotatably installed on the connection unit 130, and are configured to be relatively rotatable (e.g., rotatable relative to one another). The connection unit 130 is configured to correspond to an elbow portion and includes two pivot shafts: a first pivot shaft 131 connected to the upper arm unit 110 and a second pivot shaft 132 connected to the forearm unit 120. The forearm unit 120 may be configured to relatively rotate with respect to the upper arm unit 110 between a state in which the forearm unit 120 extends close to 180° (relative to the upper arm unit 110) and a state in which the forearm unit 120 is bent close to 0° (relative to the upper arm unit 110).

The relative rotation is achieved by winding the first and second cable units 140 and 150, and in this process, a rotational axis of the forearm unit 120 comes into rolling-contact with a rotational axis of the upper arm unit 110. A detailed description thereof will be described below.

The upper arm unit 110 includes a first rotating pulley 111, a second rotating pulley 112, and/or a third rotating pulley 113, which are sequentially arranged along one direction. The first rotating pulley 111 is arranged adjacent to a shoulder portion, and the third rotating pulley 113 is arranged corresponding to the elbow portion to form the first pivot shaft 131.

The first rotating pulley 111 receives driving force from a driving motor 119 and rotates in both directions. According to some example embodiments, the driving motor 119 may be implemented using any suitable motor (e.g., a stepper motor) that would be known to a person having ordinary skill in the art. According to some example embodiments, the driver motor 119 may rotate in a specific direction (e.g., a clockwise or counterclockwise) by a specific amount (e.g., degree of angular rotation), and/or at a specific speed (e.g., speed of rotation) determined based on a control signal received from processing circuitry (e.g., a controller) (not illustrated). The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), a digital signal processor, a microcomputer, a field programmable gate array (FPGA), a System-on-Chip (SoC), a programmable logic unit, a microprocessor, application-specific integrated circuit (ASIC), etc.

A diameter of a winding portion of the third rotating pulley 113 is formed to be larger than that of a winding portion 111a of the first rotating pulley 111, and the diameter of the winding portion of the third rotating pulley 113 compared to the that of the winding portion 111a of the first rotating pulley 111 corresponds to a reduction ratio.

According to some example embodiments, a diameter of a winding portion of the second rotating pulley 112 is formed to be larger than that of the winding portion 111a of the first rotating pulley 111 and smaller than the diameter of the winding portion of the third rotating pulley 113.

The forearm unit 120 includes a fixing pulley 121. The fixing pulley 121 is arranged to correspond to the elbow portion, and forms the second pivot shaft 132. A diameter of a winding portion of the fixing pulley 121 is formed to be the same as (or similar to) the diameter of the winding portion of the third rotating pulley 113.

When the forearm unit 120 relatively rotates with respect to the upper arm unit 110, the fixing pulley 121 is arranged to come into rolling-contact with the third rotating pulley 113. For reference, considering a driving mechanism, it is ideal (or beneficial) for the fixing pulley 121 to be arranged to come into point or line-contact with the third rotating pulley 113, but it is also preferable (or beneficial) that the fixing pulley 121 is arranged to have a micro gap in consideration of damage, noise, etc., caused by friction during the rolling-contact.

The connection unit 130 has the first pivot shaft 131 that passing through the third rotating pulley 113 to be connected to the upper arm unit 110, and the second pivot shaft 132 that passing through the fixing pulley 121 to be connected to the forearm unit 120. The typical humanoid robot has an elbow joint with one pivot shaft, but the robot joint device 100 of the inventive concepts is differentiated in that it has two pivot shafts.

The first cable unit 140 is wound around the first rotating pulley 111 in a first direction, bent between the second rotating pulley 112 and the third rotating pulley 113 to change the direction, and then fixed to the fixing pulley 121. In this case, the first cable unit 140 may be wound less than one turn around the second rotating pulley 112, the third rotating pulley 113, and the fixing pulley 121 (e.g., wound less than one turn around each of the second rotating pulley 112, the third rotating pulley 113, and the fixing pulley 121).

The second cable unit 150 is wound around the first rotating pulley 111 in a second direction opposite to the first direction, bent between the second rotating pulley 112 and the third rotating pulley 113 to be alternately arranged in an X shape with the first cable unit 140, and then fixed to the fixing pulley 121. In this case, the second cable unit 150 may be wound less than one turn around the second rotating pulley 112, the third rotating pulley 113, and the fixing pulley 121 (e.g., wound less than one turn around each of the second rotating pulley 112, the third rotating pulley 113, and the fixing pulley 121).

As the first rotating pulley 111 rotates in the first direction or the second direction, lengths of the first and second cable units 140 and 150 are adjusted, and the fixing pulley 121 rotates in the second direction or the first direction by coming into rolling-contact with the third rotating pulley 113 by the length adjustment.

Specifically, when the first rotating pulley 111 rotates in the first direction, the first cable unit 140 is configured to be unwound from the first rotating pulley 111, and the second cable unit 150 is configured to be wound around the first rotating pulley 111. Accordingly, the fixing pulley 121 comes into rolling-contact with the third rotating pulley 113 in the second direction, and the forearm unit 120 rotates in a direction in which an arm is bent (or further bent).

Conversely, when the first rotating pulley 111 rotates in the second direction, the first cable unit 140 is configured to be wound around the first rotating pulley 111, and the second cable unit 150 is configured to be unwound from the first rotating pulley 111. Accordingly, the fixing pulley 121 comes into rolling-contact with the third rotating pulley 113 in the first direction, and the forearm unit 120 rotates in a direction in which the arm extends (or further extends).

Figure 3:
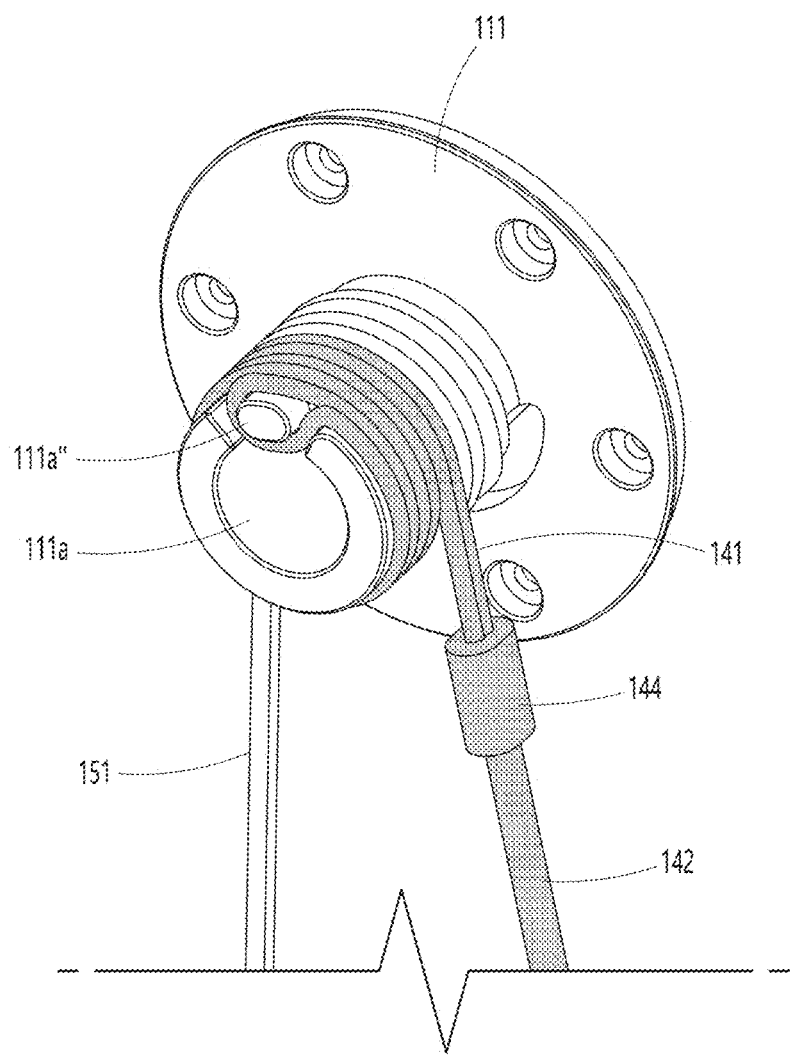
FIG. 3 is a diagram illustrating a state in which first and second cable units are wound around a first rotating pulley illustrated in FIG. 2.
Figure 4:
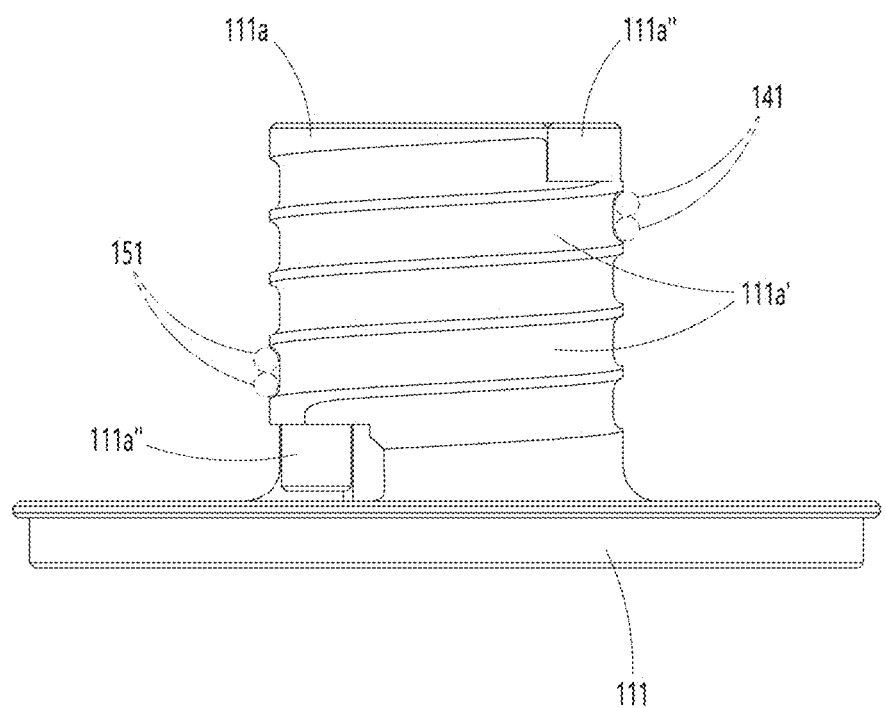
FIG. 4 is a diagram illustrating the first rotating pulley illustrated in FIG. 3.
Figure 5:
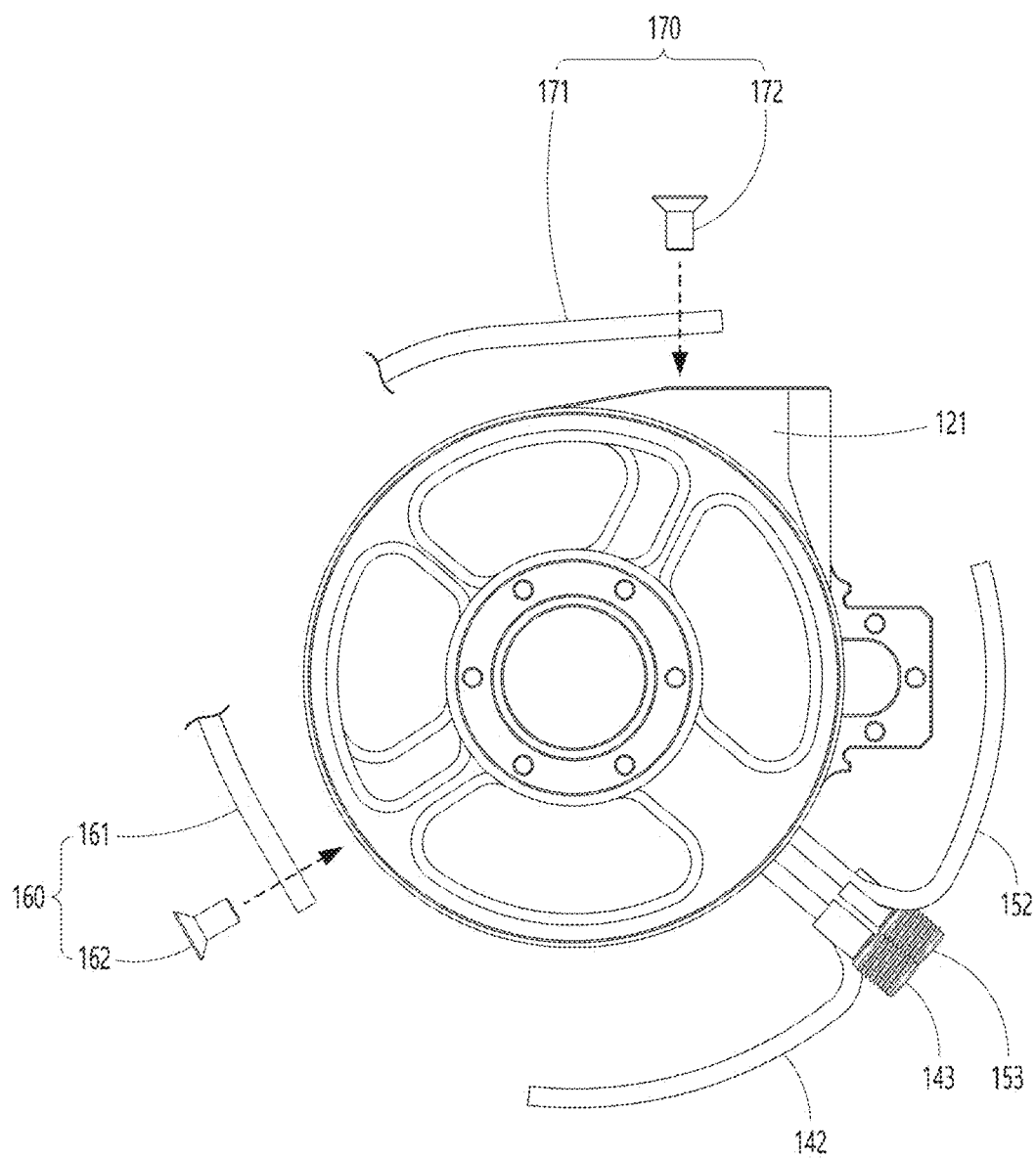
FIG. 5 is a diagram illustrating a fixing pulley and the first and second cable units fixed to the fixing pulley illustrated in FIG. 2, and first and second restraint cable units.
Figure 6:
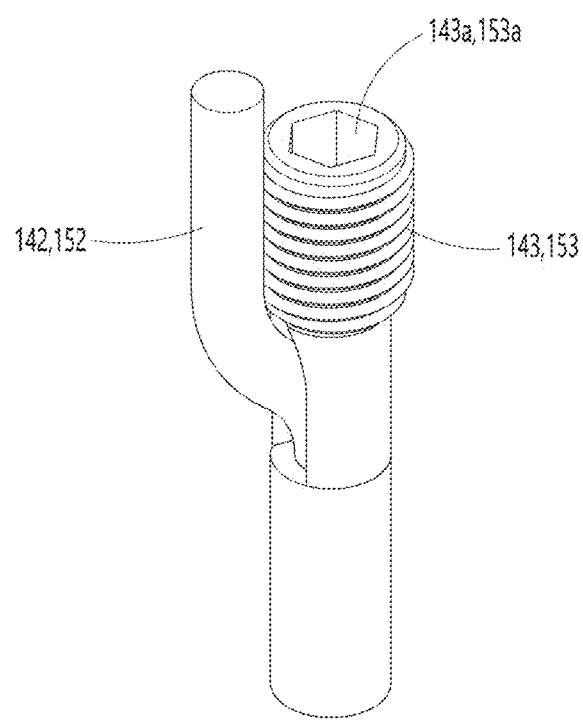
FIG. 6 is a diagram illustrating the first and second cable units illustrated in FIG. 5.
Figure 7:
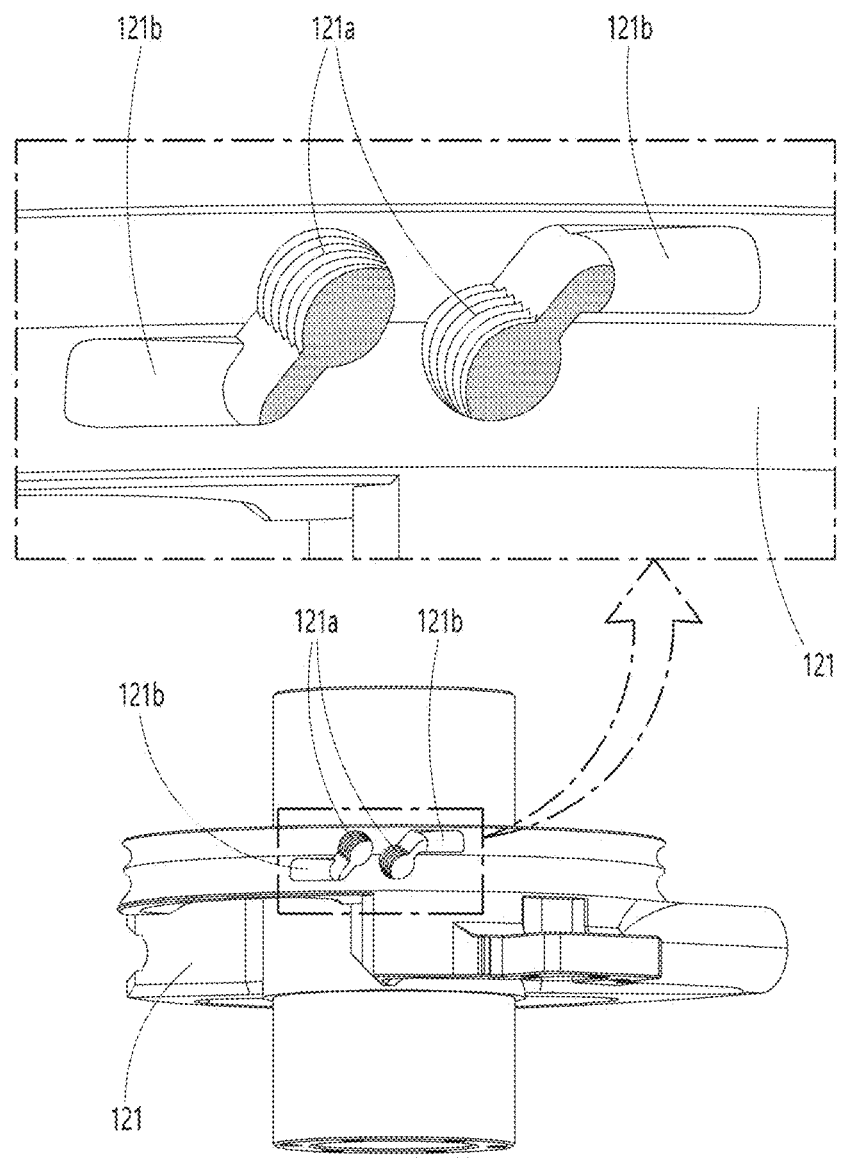
FIG. 7 is a view of part A illustrated in FIG. 5 when viewed from a different angle.

FIG. 3 is a diagram illustrating the state where the first and second cable units 140 and 150 are wound around the first rotating pulley 111 illustrated in FIG. 2, and FIG. 4 is a diagram illustrating the first rotating pulley 111 illustrated in FIG. 3. FIG. 5 is a diagram illustrating the fixing pulley 121 and the first and second cable units 140 and 150 fixed to the fixing pulley illustrated in FIG. 2, and first and second restraint cable units 160 and 170. FIG. 6 is a diagram of the first and second cable units 140 and 150 illustrated in FIG. 5, and FIG. 7 is a view of part A illustrated in FIG. 5 when viewed from a different angle.

Referring to FIGS. 3 to 7 along with the drawings above, in order to maximize (or increase) the reduction ratio, the diameter of the winding portion 111a of the first rotating pulley 111 should be minimized (or reduced). To this end, cable thicknesses of the first and second cable units 140 and 150 should be thinner. However, when the cable thickness is thinner, there the cable has lower rigidity and/or strength.

To address this challenge, when two-line thin cables are used overall (e.g., in combination, rather than only using a single thinner cable), the rigidity and/or strength are improved, but there is a challenge in that a cable-driven device becomes more complicated and is damaged when the cable(s) is/are twisted during driving.

In some example embodiments, the two-line thin cables are wound around the first rotating pulley 111 to minimize (or reduce) the diameter of the winding portion 111a of the first rotating pulley 111, and a single-line thick cable is used in the second rotating pulley 112, the third rotating pulley 113, and the fixing pulley 121 to improve the rigidity and/or strength and simplify the cable-driven device.

Specifically, the first and second cable units 140 and 150 each include first cables 141 and 151, second cables 142 and 152, and fixing members 143 and 153.

The first cables 141 and 151 have a first diameter and are wound around the first rotating pulley 111 overlapping in two lines. The first cable 141 of the first cable unit 140 is wound around the first rotating pulley 111 in the first direction, and the first cable 151 of the second cable unit 150 is wound around the first rotating pulley 111 in the second direction.

To this end, the winding portion 111a of the first rotating pulley 111 may be formed with a spiral groove 111a' that defines a position where the first cables 141 and 151, which overlap in two lines, are wound. That is, the first cables 141 and 151, which overlap in two lines, are wound together in the spiral groove 111a'.

Both sides of the spiral groove 111a' may be provided with hangers 111a" to which the first cables 141 and 151 may be hung and fixed. In this drawing, the first cable 141 of the first cable unit 140 is hung and fixed to the hanger 111a" positioned on the outside and is wound in the first direction along the spiral groove 111a', and the first cable 151 of the second cable unit 150 is hung and fixed to the hanger 111a" positioned on the inside and is wound in the second direction along the spiral groove 111a'. The first cable 141 of the first cable unit 140 and the first cable 151 of the second cable unit 150 are arranged to be closer to each other as the first cable 141 and the first cable 151 are wound around the first rotating pulley 111.

The second cables 142 and 152 have a second diameter larger than the first diameter, and are connected to the first cables 141 and 151 and partially wound around the second rotating pulley 112, the third rotating pulley 113, and the fixing pulley 121 in a single line. The first cables 141 and 151 and the second cables 142 and 152 having different diameters may be connected by cable fittings 144 and 154. In the drawings, it is illustrated that the cable fittings 144 and 154 are configured to clamp both end parts of the first cables 141 and 151 and one end part of the second cables 142 and 152.

The fixing members 143 and 153 are provided at the other end parts of the second cables 142 and 152 and are fastened to the fixing pulley 121. The fixing member 143 for fixing the second cable 142 of the first cable unit 140 and the fixing member 153 for fixing the second cable 152 of the second cable unit 150 may be arranged adjacent to each other.

The fixing members 143 and 153 may be configured to adjust an insertion depth into the fixing pulley 121 to adjust tension. In the drawings, it is illustrated that the fixing members 143 and 153 are shown as being formed by a set screw of which the outer circumference is formed with a screw thread and upper end part is formed with sockets 143a and 153a into which wrenches may be inserted.

The fixing pulley 121 may be provided with a screw groove 121a formed to enable screw fastening of the fixing members 143 and 153 formed by the set screw, and a cable guide groove 121b that extends from the screw groove 121a to guide a space where the other end portion of the second cables 142 and 152 is seated. The screw groove 121a for fixing the second cable 142 of the first cable unit 140 and the screw groove 121a for fixing the second cable 152 of the second cable unit 150 are arranged adjacent to each other, and each cable guide groove 121b extends in a direction farther away from the other.

The screw groove 121a may be formed to extend toward a center of the fixing pulley 121. In order to reduce weight, the fixing pulley 121 may have a spoke wheel shape, and the screw groove 121a may be formed to extend along a longitudinal direction of one of the spoke portions.

The robot joint device 100 further includes a support frame 114, the first restraint cable unit 160, and/or the second restraint cable unit 170 so that the fixing pulley 121 comes into rolling-contact with the third rotating pulley 113.

The support frame 114 rotatably supports the third rotating pulley 113 and has a round portion 114a corresponding to an outer circumference of the third rotating pulley 113. That is, a radius of curvature of the round portion 114a corresponds to a radius of the third rotating pulley 113. The round portion 114a is arranged to overlap a part of the fixing pulley 121 in a direction perpendicular to the first and second pivot shafts 131 and 132 so that the first and second restraint cable units 160 and 170 are fixed.

For reference, the support frame 114 may be formed to rotatably support not only the third rotating pulley 113 but also the second rotating pulley 112.

For reference, a part of the winding portion of the third rotating pulley 113 is arranged to overlap another part of the fixing pulley 121 in the direction perpendicular to the first and second pivot shafts 131 and 132 so that the first and second cable units 140 and 150 are wound.

The first restraint cable unit 160 is fixed to the fixing pulley 121 and the round portion 114a, so that the fixing pulley 121 comes into rolling-contact with the third rotating pulley 113, and the second restraint cable unit 170 is fixed to the fixing pulley 121 and the round portion 114a, while, intersecting the first restraint cable unit 160 in an X shape. Therefore, the fixing pulley 121 may rotate by coming into rolling-contact rotation with the third rotating pulley 113 without slipping, like a contact surface of Jacob's Ladder.

The first and second restraint cable units 160 and 170 each include restraint cables 161 and 171, and fixing members 162 and 172, respectively.

The restraint cables 161 and 171 are partially wound around the round portion 114a and the fixing pulley 121. The restraint cable 161 of the first restraint cable unit 160 and the restraint cable 171 of the second restraint cable unit 170 are arranged to intersect each other in an X shape.

The fixing members 162 and 172 are provided at both end parts of the restraint cables 161 and 171, and are fastened to the round portion 114a and the fixing pulley 121, respectively. One of the fixing members 162 and 172 provided at both end parts of the restraint cables 161 and 171 may be configured to adjust an insertion depth into the round portion 114a or the fixing pulley 121 to adjust the tension. According to some example embodiments, both of the fixing members 162 and 172 may fasten first ends of the restraint cables 161 and 171 to the fixing pulley (see, e.g., FIG. 7). According to some example embodiments, each of the first and second restraint cable units 160 and 170 may have other fixing members that fasten second ends of the restraint cables 161 and 171 (opposite the restraint cables 161 and 171 to the first ends) to the round portion 114a.

Figure 8:
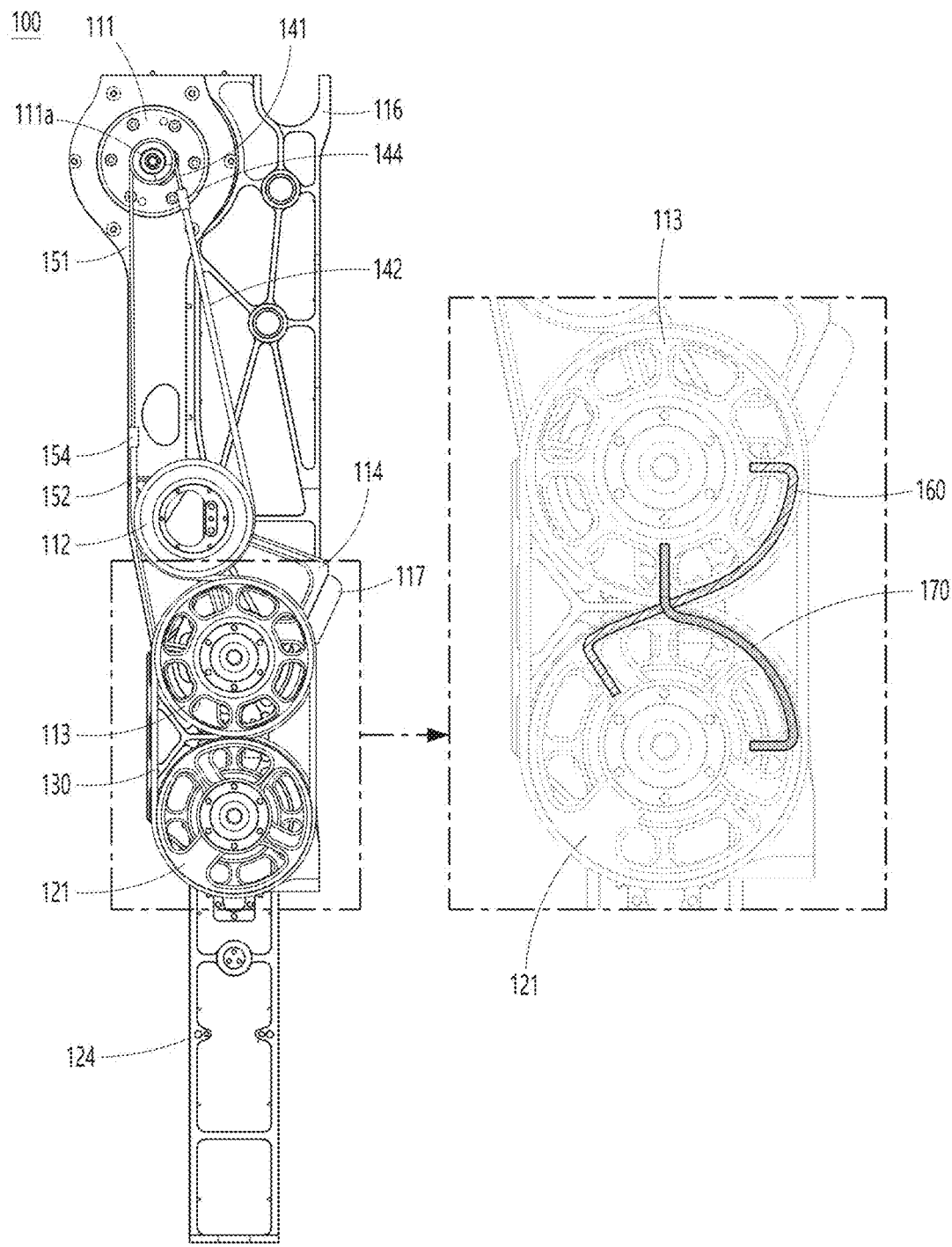
FIGS. 8 and 9 are conceptual diagrams for describing a driving mechanism of the robot joint device illustrated in FIG. 1.
Figure 9:
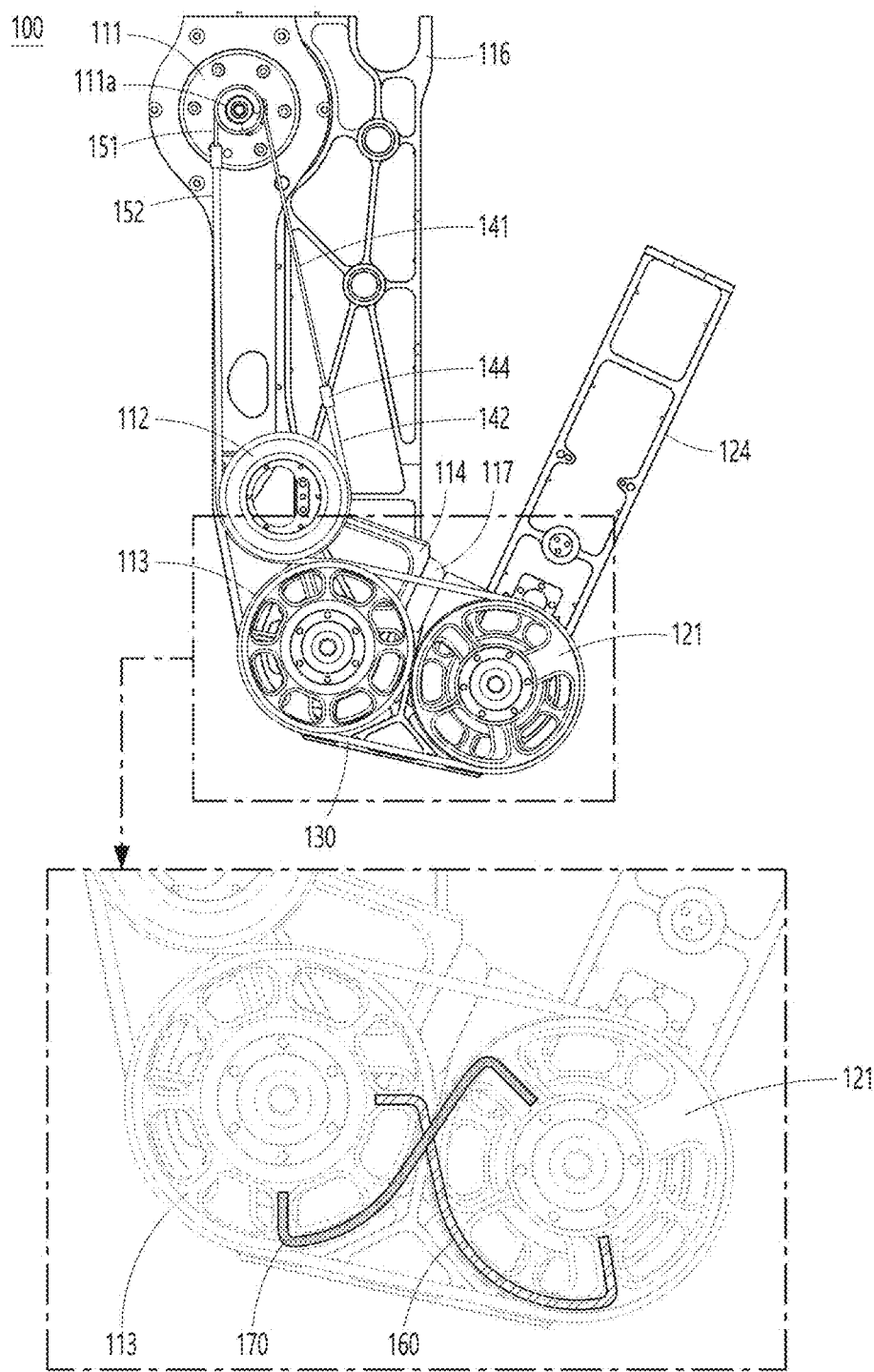

FIGS. 8 and 9 are conceptual diagrams for describing a driving mechanism of the robot joint device 100 illustrated in FIG. 1. FIG. 8 illustrates that the forearm unit 120 maximally extended (or at its greatest extension) with respect to the upper arm unit 110, and FIG. 9 illustrates that the forearm unit 120 is maximally bent (or at its greatest amount of bend) with respect to the upper arm unit 110.

The first restraint cable unit 160 is arranged to cover ¼ of the outer circumference of the fixing pulley 121 while the forearm unit 120 maximally extends (or is at its greatest extension) close to 180° with respect to the upper arm unit 110. Accordingly, the rotation angle may be limited so that the forearm unit 120 extends close to 180° with respect to the upper arm unit 110 but is not bent more than 180°.

The second restraint cable unit 170 is arranged to cover ¼ of the outer circumference of the fixing pulley 121 while the forearm unit 120 is maximally bent (or at its greatest amount of bend) close to 0° with respect to the upper arm unit 110. Accordingly, the rotation angle may be limited so that the forearm unit 120 is bent close to 0° with respect to the upper arm unit 110 but is not bent more than that.

The angle at which the upper arm unit 110 extends and is bent with respect to the forearm unit 120 may be physically limited.

First, the structure in which the angle at which the upper arm unit 110 extends with respect to the forearm unit 120 is physically limited will be described.

Referring back to FIGS. 1 and 2, the upper arm unit 110 further includes an upper arm frame 116 rotatably installed on the first pivot shaft 131, and the forearm unit 120 further includes a forearm frame 124 rotatably installed on the second pivot shaft 132. The upper arm frame 116 is formed to be relatively rotatable with respect to the connection unit 130 around the first pivot shaft 131 as the center, and the forearm frame 124 is formed to be relatively rotatable with respect to the connection unit 130 centered on the second pivot shaft 132.

When the fixing pulley 121 is axially connected to the forearm frame 124, and the fixing pulley 121 comes into rolling-contact with the third rotating pulley 113, the forearm frame 124 relatively rotates with respect to the connection unit 130 centered on the second pivot shaft 132. Therefore, the forearm frame 124 relatively rotates with respect to the upper arm frame 116.

In addition, as the fixing pulley 121 comes into rolling-contact with the third rotating pulley 113 and the second pivot shaft 132 moves, the connection unit 130 also relatively rotates with respect to the upper arm frame 116 centered on the first pivot shaft 131.

Considering the above mechanism, the connection unit 130 is provided with stoppers 133 that come into contact with the upper arm frame 116 and the forearm frame 124 at a preset (or alternatively, given) angle. In some example embodiments, protrusions 116a and 124a, which are each caught by the stoppers 133, are formed protruding from each end parts of the upper arm frame 116 and the forearm frame 124 while the forearm unit 120 is maximally unfolded (or unfolded to a greatest extent) close to 180° with respect to the upper arm unit 110. That is, the stopper 133 is configured to limit a relative rotation angle of the upper arm unit 110 and a relative rotation angle of the forearm unit 120 with respect to the connection unit 130.

While the first rotating pulley 111 rotates at a preset (or alternatively, given) rotational speed and the forearm unit 120 fully extends with respect to the upper arm unit 110, the first restraint cable unit 160 is arranged to cover ¼ of the outer circumference of the fixing pulley 121, and the respective protrusions 116a and 124a of the upper arm frame 116 and the forearm frame 124 are caught by the stoppers 133.

When the first rotating pulley 111 is rotated at a preset (or alternatively, given) rotational speed so that the forearm unit 120 fully extends with respect to the upper arm unit 110, but the respective protrusions 116a and 124a of the upper arm frame 116 and the forearm frame 124 are not caught by the stoppers 133, a challenge may occur where the forearm unit 120 may further rotate with respect to the upper arm unit 110 due to an unexpected external force. This may cause an unintended load on at least one of the first rotating pulley 111 or the first restraint cable unit 160, and in some cases, may cause damage to the first rotating pulley 111 or the first restraint cable unit 160.

In address this challenge, an opening 134 corresponding to the stopper 133 may be formed in the connection unit 130. When the forearm unit 120 extends with respect to the upper arm unit 110 at a maximum (or greatest) angle, it is possible to visually check whether the respective protrusions 116a and 124a of the upper arm frame 116 and the forearm frame 124 are caught by the stopper 133 through the opening 134.

Similarly, a bending angle of the upper arm unit 110 with respect to the forearm unit 120 may also be physically limited. For example, while the forearm unit 120 is maximally bent (or at its greatest amount of bend) close to 0° with respect to the upper arm unit 110, the forearm unit 120 may be configured to contact the upper arm unit 110 to limit further rotation.

In some example embodiment, it is illustrated that the stopper 117 mounted on the support frame 114 is configured to contact the fixing pulley 121 while the forearm unit 120 is maximally bent close to 0° with respect to the upper arm unit 110. The stopper 117 and the fixing pulley 121 may be made to be in surface contact. To this end, the fixing pulley 121 may be provided with a flat contact surface corresponding to a flat upper surface of the stopper 117.

By the structure that physically limits the above-described bending angle, the first and second cable units 140 and 150 wound around the winding portion of the third rotating pulley 113 may be prevented from being separated (or the occurrence thereof may be reduced).

Figure 10:
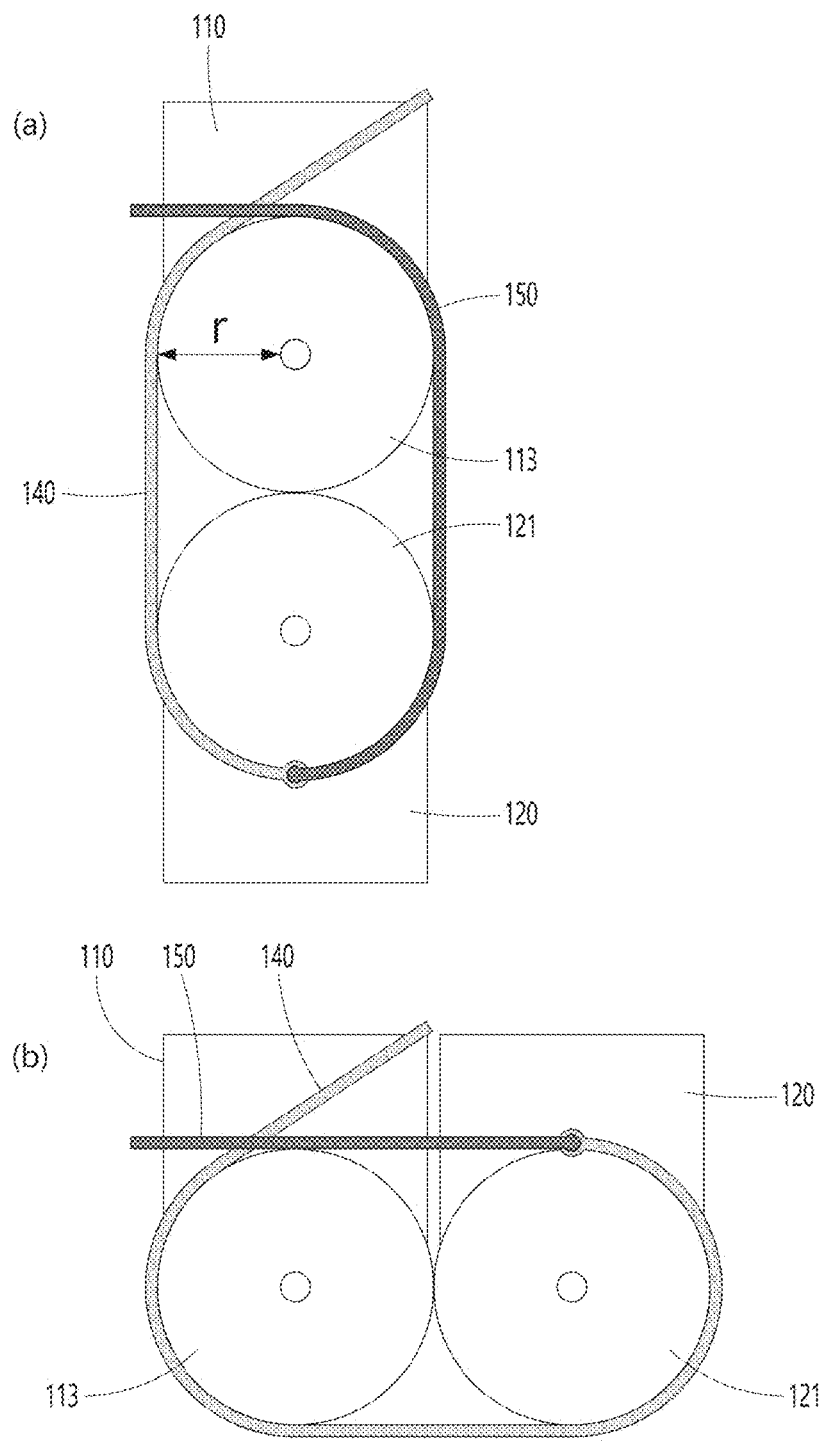
FIG. 10 is a conceptual diagram for describing that lengths of the first and second cable units wound around a third rotating pulley and the fixing pulley are maintained constant while a forearm unit relatively rotates with respect to an upper arm unit.

FIG. 10 is a conceptual diagram for describing that the lengths of the first and second cable units 140 and 150 wound around the third rotating pulley 113 and the fixing pulley 121 are maintained constant (or substantially constant) while the forearm unit 120 relatively rotates with respect to the upper arm unit 110.

Referring to FIG. 10, even if the forearm unit 120 rotates 180° while extending 180° with respect to the upper arm unit 110 and bent to face each other (0°), it may be checked that the sum of the lengths of the first and second cable units 140 and 150 that surround the third rotating pulley 113 and the fixing pulley 121 is constant (or substantially constant). That is, the reduction ratio of the third rotating pulley 113 and the fixing pulley 121 that are in rolling-contact is 1:1.

Therefore, the reduction ratio of the robot joint device 100 is determined by the diameter of the winding portion of the third rotating pulley 113 with respect to the diameter of the winding portion 111a of the first rotating pulley 111. For example, when the diameter of the winding portion of the third rotating pulley 113 is three times the diameter of the winding portion 111a of the first rotating pulley 111, the reduction ratio is 1:3.

According to some example embodiments, a structure is provided that is capable of minimizing (or reducing) a load applied to drive cables 181 and 182, an electric cable 183, etc., passing through a joint area.

Figure 11:
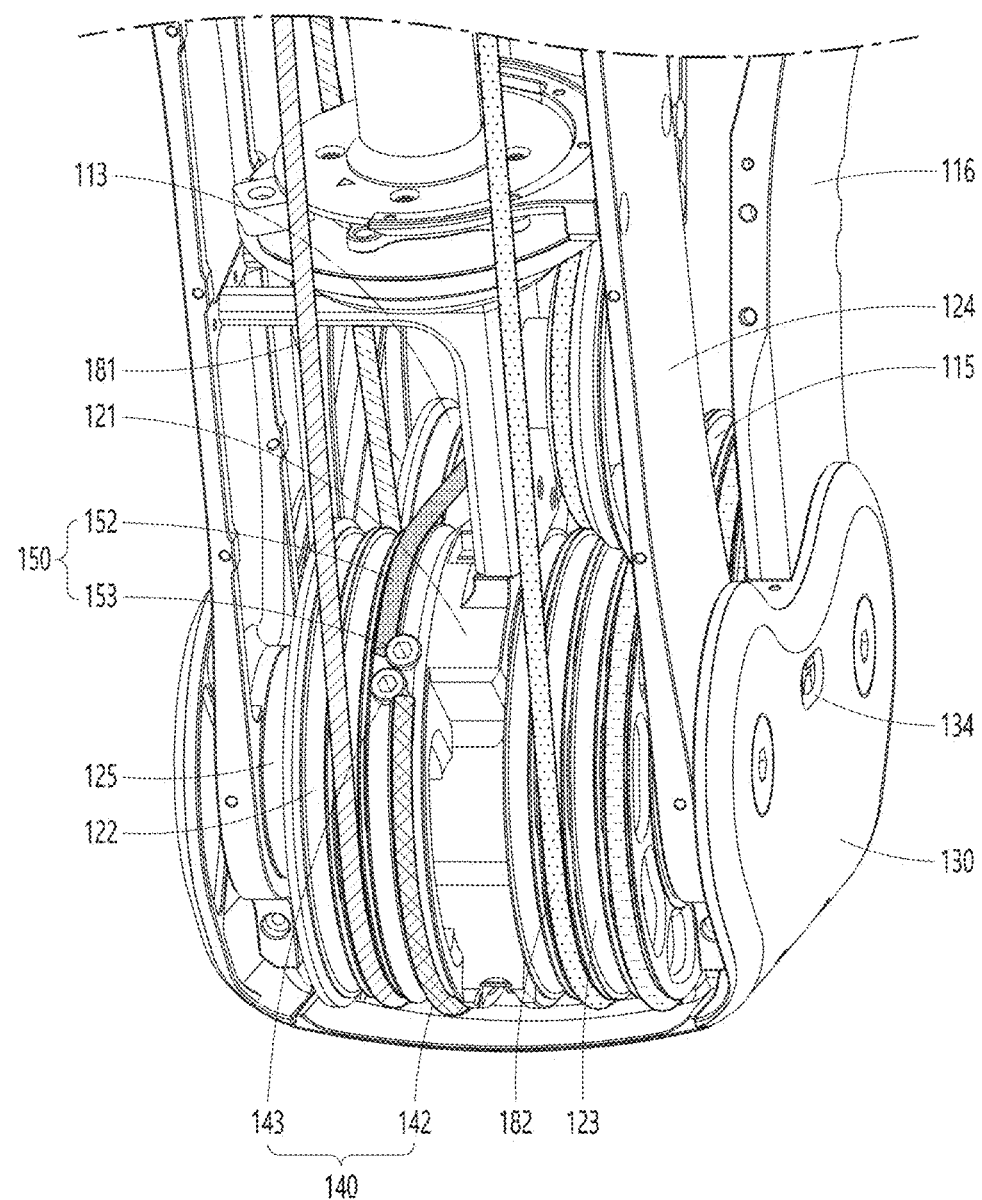
FIG. 11 is a conceptual diagram illustrating various cables wound around a joint portion illustrated in FIG. 1.
Figure 12:
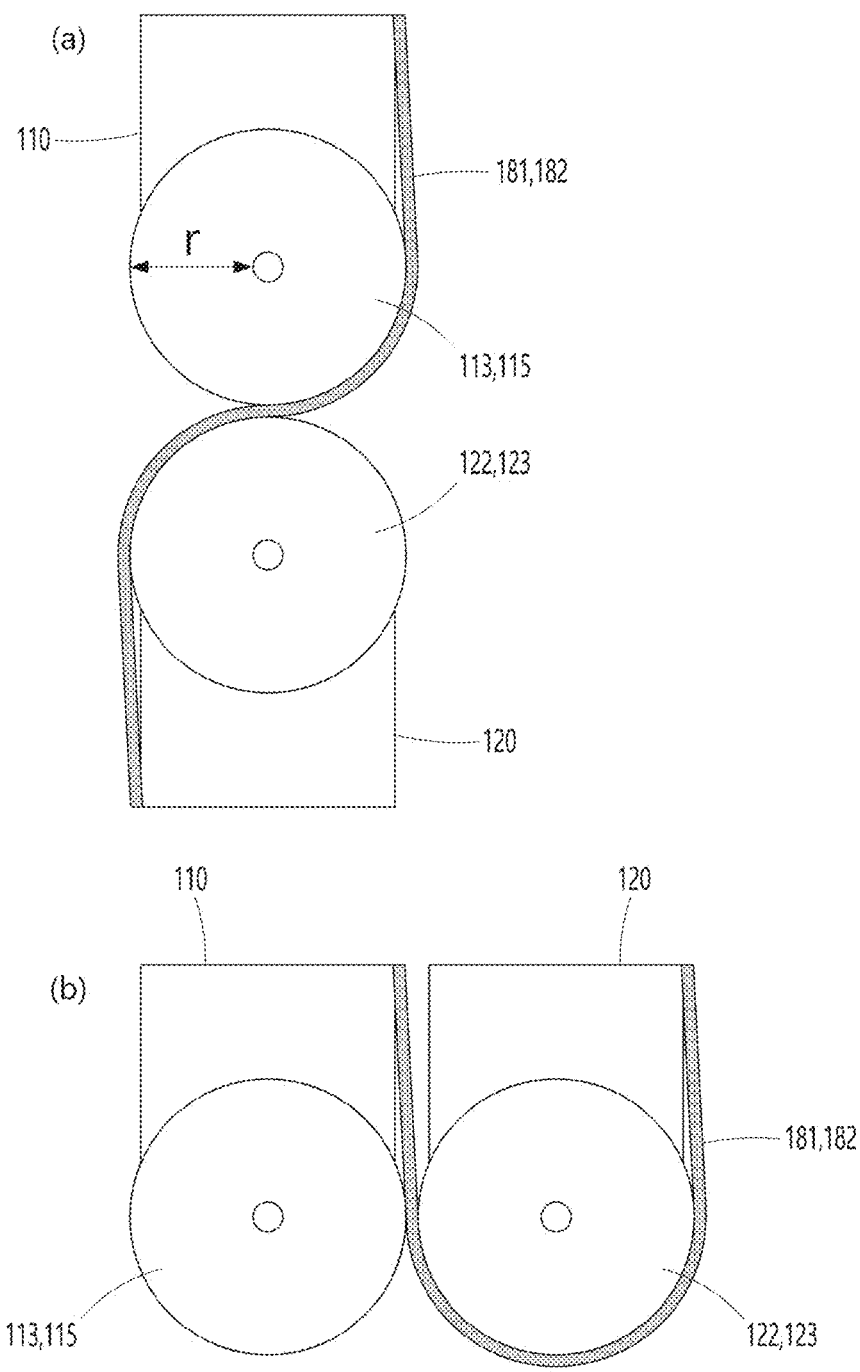
FIGS. 12 and 13 are conceptual diagrams illustrating the arrangement of electric cables while the forearm unit relatively rotates with respect to the upper arm unit.

FIG. 11 is a conceptual diagram illustrating various cables 181, 182, and 183 wound around the joint portion illustrated in FIG. 1, and FIG. 12 is a conceptual diagram for describing that the lengths of the first and second drive cables 181 and 182 do not change while the forearm unit 120 relatively rotates with respect to the upper arm unit 110.

Referring to FIGS. 11 and 12 together with FIG. 2 above, the upper arm unit 110 further includes a fourth rotating pulley 115 arranged on an opposite side to the third rotating pulley 113 with the support frame 114 interposed therebetween, and the forearm unit 120 further includes a fifth rotating pulley 122 and a sixth rotating pulley 123 arranged on opposing sides of the fixing pulley 121.

In the third rotating pulley 113 and the fifth rotating pulley 122, which are arranged on the same plane (or similar planes), a first drive cable 181 for driving a wrist joint assembly is arranged in a bent form between the third rotating pulley 113 and the fifth rotating pulley 122. Specifically, the first drive cable 181 is connected to a pulley (not illustrated) positioned on the upper arm unit 110 side, and one side and the other side of the first drive cable 181 are alternately arranged in an X shape between the third rotating pulley 113 and the fifth rotating pulley 122.

Similarly, in the fourth rotating pulley 115 and the sixth rotating pulley 123 which are arranged on the same plane (or similar planes), a second drive cable 182 for driving a wrist joint assembly is alternately arranged in an X shape between the fourth rotating pulley 115 and the sixth rotating pulley 123. Specifically, the second drive cable 182 is connected to the pulley (not illustrated) positioned on the upper arm unit 110 side, and one side and the other side of the second drive cable 182 are alternately arranged in an X shape between the fourth rotating pulley 115 and the sixth rotating pulley 123.

According to the above arrangement, the lengths of the first and second drive cables 181 and 182 do not change (or do not substantially change) while the forearm unit 120 relatively rotates with respect to the upper arm unit 110. Therefore, the load applied to the first and second drive cables 181 and 182 may be minimized (or reduced) when the angle of the joint changes.

Figure 13:
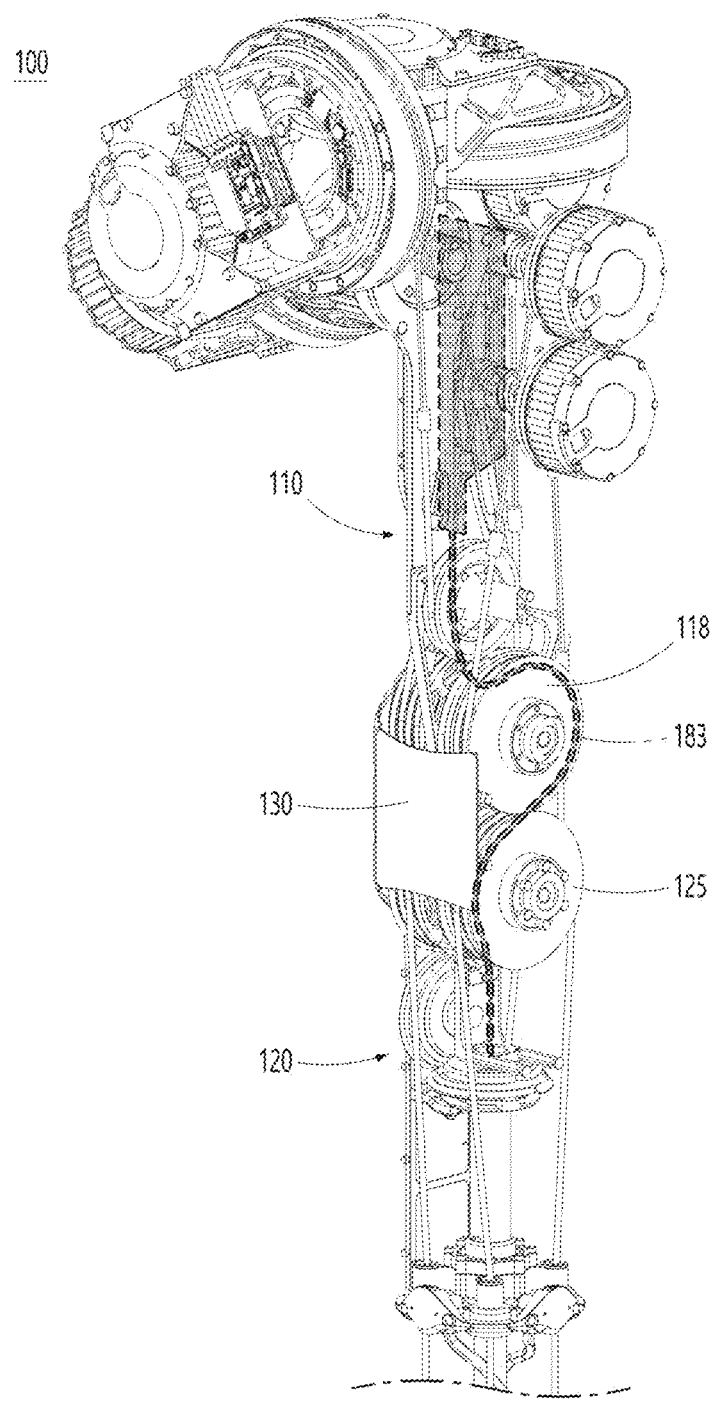
Figure 14:
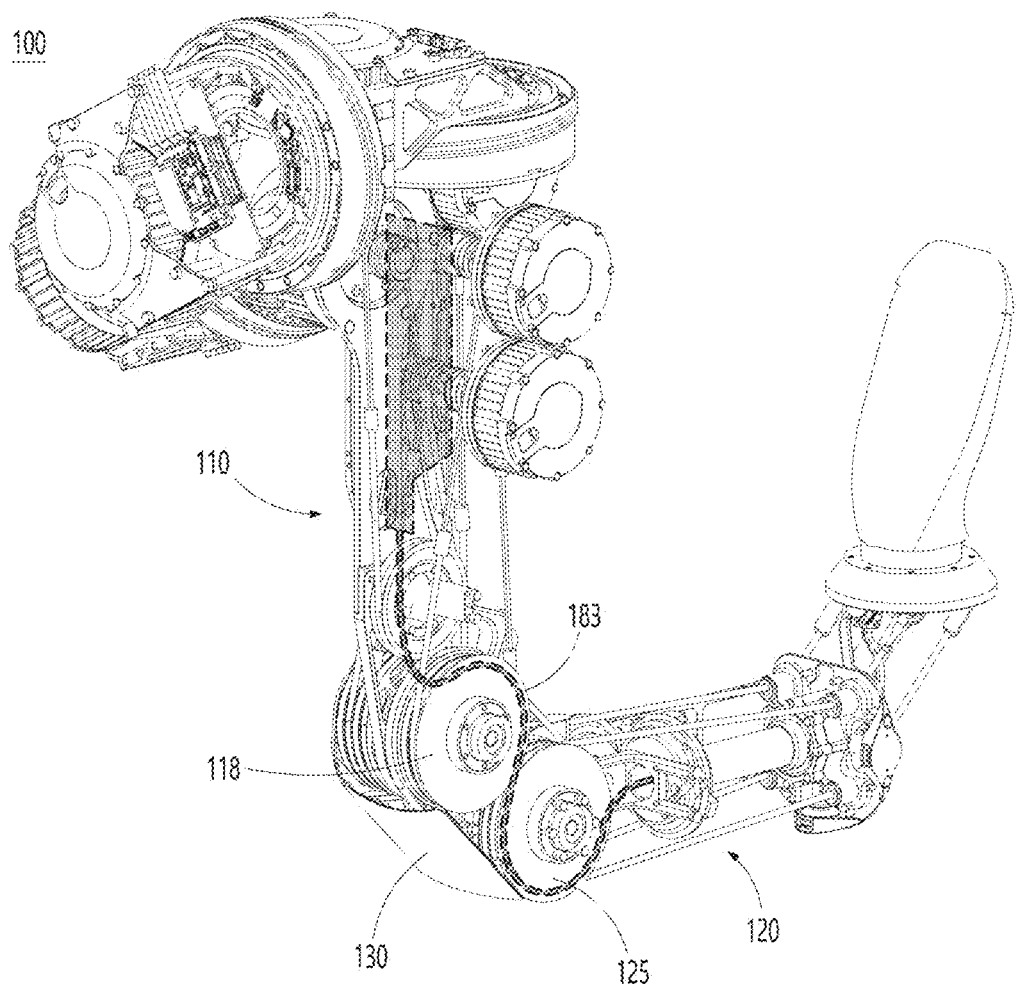
FIG. 14 is a conceptual diagram for describing that a length of the electric cables does not change while the forearm unit relatively rotates with respect to the upper arm unit.

FIGS. 13 and 14 are conceptual diagrams illustrating the arrangement of the electric cable 183 while the forearm unit 120 relatively rotates with respect to the upper arm unit 110.

Referring to FIGS. 13 and 14, a first bracket 118 is installed on one side of the third rotating pulley 113 facing the upper arm frame 116, and a second bracket 125 is installed on one side of the fixing pulley 121 facing the forearm frame 124.

The winding portion is provided in a part of the first bracket 118 facing the upper arm frame 116, and the winding portion is provided in a part of the second bracket 125 facing the forearm frame 124. The electric cable 183 is alternately arranged in the winding portion of the first bracket 118 and the winding portion of the second bracket 125.

According to the arrangement, the length of the electric cable 183 does not change (or does not substantially change) while the forearm unit 120 relatively rotates with respect to the upper arm unit 110. Therefore, the load applied to the electric cable 183 when the angle of the joint changes may be minimized (or reduced).

The above-described detailed description is to be interpreted as being illustrative rather than being restrictive in all aspects. The scope of the inventive concepts are to be determined by reasonable interpretation of the claims, and all modifications within an equivalent range of the inventive concepts fall in the scope of the inventive concepts.

The invention claimed is:

1. A robot joint device, comprising:
   an upper arm unit including a first rotating pulley, a second rotating pulley and a third rotating pulley sequentially arranged in one direction;
   a forearm unit including a fixing pulley, the fixing pulley being configured to come into a rolling-contact with the third rotating pulley;
   a connection unit including a first pivot shaft and a second pivot shaft, the first pivot shaft passing through the third rotating pulley and being connected to the upper arm unit, and the second pivot shaft passing through the fixing pulley and being connected to the forearm unit;
   a first cable unit wound around the first rotating pulley in a first direction, the first cable unit being bent between the second rotating pulley and the third rotating pulley, and the first cable unit being fixed to the fixing pulley; and
   a second cable unit wound around the first rotating pulley in a second direction opposite to the first direction, the second cable unit being bent between the second rotating pulley and the third rotating pulley, and the second cable unit being fixed to the fixing pulley.

2. The robot joint device of claim 1, wherein a diameter of a winding portion of the third rotating pulley is larger than a diameter of a winding portion of the first rotating pulley.

3. The robot joint device of claim 2, wherein the winding portion of the third rotating pulley and the winding portion of the fixing pulley have a same diameter.

4. The robot joint device of claim 1, wherein each of the first cable unit and the second cable unit includes:
   a first cable wound around the first rotating pulley overlapping in two lines, the first cable having a first diameter;
   a second cable connected to the first cable and partially wound around each of the second rotating pulley, the third rotating pulley and the fixing pulley in a single line, the second cable having a second diameter larger than the first diameter; and
   a fixing member an end part of the second cable, the fixing member being fastened to the fixing pulley.

5. The robot joint device of claim 4, wherein the fixing member is configured to adjust an insertion depth into the fixing pulley to adjust tension.

6. The robot joint device of claim 1, further comprising:
   a support frame configured to rotatably support the third rotating pulley, the support frame including a round portion corresponding to an outer circumference of the third rotating pulley;
   a first restraint cable unit fixed to the fixing pulley and the round portion such that the fixing pulley comes into rolling-contact with the third rotating pulley; and
   a second restraint cable unit fixed to the fixing pulley and the round portion while intersecting the first restraint cable unit such that the fixing pulley comes into rolling-contact with the third rotating pulley.

7. The robot joint device of claim 6, wherein each of the first restraint cable unit and the second restraint cable unit includes:
   a restraint cable partially wound around the round portion and the fixing pulley; and
   fixing members at both end parts of the restraint cable, the fixing members being fastened to the round portion and the fixing pulley, respectively.

8. The robot joint device of claim 7, wherein
   the fixing members include a first fixing member and a second fixing member;
   the first fixing member is configured to adjust an insertion depth into the round portion to adjust tension; and
   the second fixing member is configured to adjust an insertion depth into the fixing pulley to adjust tension.

9. The robot joint device of claim 6, wherein
   the upper arm unit includes a fourth rotating pulley opposite to the third rotating pulley with the support frame interposed therebetween;
   the forearm unit includes a fifth rotating pulley and a sixth rotating pulley on opposing sides of the fixing pulley, the fifth rotating pulley and the third rotating pulley being on a same plane, and the sixth rotating pulley and the fourth rotating pulley being on a same plane; and
   the robot joint device further comprises,
      a first drive cable on the third rotating pulley and the fifth rotating pulley for driving a wrist joint assembly, and
      a second drive cable on the fourth rotating pulley and the sixth rotating pulley for driving the wrist joint assembly.

10. The robot joint device of claim 1, wherein
    the upper arm unit includes an upper arm frame rotatably installed on the first pivot shaft;
    the forearm unit includes a forearm frame rotatably installed on the second pivot shaft; and
    the connection unit includes a stopper configured to contact the upper arm frame and the forearm frame at a first angle to limit both a rotation angle of the upper arm unit and a rotation angle of the forearm unit relative to the connection unit.

11. The robot joint device of claim 10, wherein the connection unit includes an opening corresponding to the stopper such that the upper arm frame and the forearm frame contacting the stopper while the forearm unit extends at a maximum angle with respect to the upper arm unit is visible through the opening.

12. The robot joint device of claim 10, further comprising:
    a first bracket on one side of the third rotating pulley facing the upper arm frame;
    a second bracket on one side of the fixing pulley facing the forearm frame; and
    an electric cable on a winding portion of the first bracket and a winding portion of the second bracket.

13. A robot joint device, comprising:
    an upper arm unit including a rotating pulley;
    a forearm unit including a fixing pulley, the fixing pulley being configured to come into rolling-contact with the rotating pulley based on the forearm unit rotating relative to the upper arm unit;
    a connection unit including a first pivot shaft and a second pivot shaft, the first pivot shaft passing through the rotating pulley and being connected to the upper arm unit, and the second pivot shaft passing through the fixing pulley and being connected to the forearm unit;
    a first cable unit covering the rotating pulley and a part of the fixing pulley, the first cable unit being fixed to the fixing pulley; and
    a second cable unit covering the rotating pulley and another part of the fixing pulley, the second cable unit being fixed to the fixing pulley.

14. The robot joint device of claim 13, wherein a winding portion of the rotating pulley and a winding portion of the fixing pulley have a same diameter.

15. The robot joint device of claim 13, further comprising:
a support frame configured to rotatably support the rotating pulley, the support frame including a round portion corresponding to an outer circumference of the rotating pulley;
a first restraint cable unit fixed to the fixing pulley and the round portion such that the fixing pulley comes into rolling-contact with the rotating pulley; and
a second restraint cable unit fixed to the fixing pulley and the round portion while intersecting the first restraint cable unit such that the fixing pulley comes into rolling-contact with the rotating pulley.

16. The robot joint device of claim 15, wherein each of the first restraint cable unit and the second restraint cable unit includes:
a restraint cable partially wound around the round portion and the fixing pulley; and
fixing members at both end parts of the restraint cable, the fixing members being fastened to the round portion and the fixing pulley, respectively.

17. The robot joint device of claim 16, wherein
the fixing members include a first fixing member and a second fixing member;
the first fixing member is configured to adjust an insertion depth into the round portion to adjust tension; and
the second fixing member is configured to adjust an insertion depth into the fixing pulley to adjust tension.

18. The robot joint device of claim 15, wherein
the rotating pulley is a first rotating pulley;
the upper arm unit includes a second rotating pulley opposite to the first rotating pulley with the support frame interposed therebetween;
the forearm unit includes a third rotating pulley and a fourth rotating pulley on opposing sides of the fixing pulley, the third rotating pulley and the first rotating pulley being on a same plane, and the fourth rotating pulley and the second rotating pulley being on a same plane; and
the robot joint device further comprises,
a first drive cable on the first rotating pulley and the third rotating pulley for driving a wrist joint assembly, and
a second drive cable on the second rotating pulley and the fourth rotating pulley for driving the wrist joint assembly.

19. The robot joint device of claim 13, wherein
the upper arm unit includes an upper arm frame rotatably installed on the first pivot shaft;
the forearm unit includes a forearm frame rotatably installed on the second pivot shaft; and
the connection unit includes a stopper configured to contact the upper arm frame and the forearm frame at a first angle to limit both a rotation angle of the upper arm unit and a rotation angle of the forearm unit relative to the connection unit.

20. The robot joint device of claim 19, further comprising:
a first bracket on one side of the rotating pulley facing the upper arm frame;
a second bracket on one side of the fixing pulley facing the forearm frame; and
an electric cable on a winding portion of the first bracket and a winding portion of the second bracket.

* * * * *